United States Patent
Kawano et al.

(10) Patent No.: US 6,480,448 B1
(45) Date of Patent: Nov. 12, 2002

(54) DISC PLAYER

(75) Inventors: Eisaku Kawano, Saitama (JP); Yoshitaka Shimoda, Saitama (JP); Hidehiro Ishii, Saitama (JP); Eiji Muramatsu, Saitama (JP); Masahiro Kato, Saitama (JP); Kunihiko Horikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/375,565

(22) Filed: Aug. 17, 1999

(30) Foreign Application Priority Data

Aug. 20, 1998 (JP) .......................................... 10-233879

(51) Int. Cl.[7] ................................................ G11B 7/00
(52) U.S. Cl. ...................... 369/47.5; 369/53.1; 369/59.1
(58) Field of Search ............................ 369/47.1, 47.11, 369/47.5, 47.51, 47.53, 42.55, 53.1, 53.11, 53.23, 53.26, 53.27, 59.1, 59.11, 59.12

(56) References Cited

U.S. PATENT DOCUMENTS

| | | | | |
|---|---|---|---|---|
| 5,305,296 A | * | 4/1994 | Kono ....................... | 369/47.53 |
| 5,317,549 A | * | 5/1994 | Maeda et al. ............ | 369/53.24 |
| 5,341,360 A | | 8/1994 | Johann et al. ............ | 369/116 |
| 5,412,628 A | | 5/1995 | Yamazaki et al. ......... | 369/32 |

* cited by examiner

*Primary Examiner*—Muhammad Edun
(74) *Attorney, Agent, or Firm*—Sughrue Mion, PLLC (57) ABSTRACT

In a disc player, a CAL pattern is recorded in a disc-like optical recording medium during a recording stand-by time period, which is yielded by a difference between a data rate in inputting information to a disc player 50 and a recording rate in recording information into the optical recording medium. The CAL pattern is reproduced from the optical recording medium, the reproduced pattern is evaluated, and an irradiation intensity of a laser beam is optimized for recording information in the optical recording medium, by a laser-output controller 30.

17 Claims, 6 Drawing Sheets

1 RECORDING UNIT

DISC PLAYER

BACKGROUND OF THE INVENTION

1. Field of the Invention

The present invention relates to a disc player of the recording type, and more particularly the invention relates to a disc player capable of improving an information recording accuracy in recording information in a disc-like optical recording medium of the erasable type.

2. Description of the Related Art

With progress of multimedia technology, the technical field of image processing calls for recording media capable of storing a large amount of digitized image data. A variety of information recording media are known. Of those recording media, inter alia an optical recording medium has attracted great attention with expectancy of superseding the magnetic tape because the optical recording medium has the following excellent features: capability of handling a large amount of digital information, ease of stopping dynamic image information and feeding of image frames, and random-access being possible.

Of the optical recording media, a CD-R (CD-recordable) is widely used which is categorized into the write-once optical recording media. A CD-RAM (CD-rewritable), which is categorized into an optical recording medium of the rewritable type, has been put in practical use.

The principles of the optical recording medium follow. Laser light is emitted from an optical pickup device toward the recording surface of the optical recording medium, and condensed and converted from optical energy to thermal energy, and the physical state of the recording surface of the optical recording medium is changed, with the thermal energy, to record information in the form of changes of the physical state.

It is frequent that the recording characteristics of the optical recording media are different for each disc even if those media are made of the same information storing material. This is due to the fact that the material properties and molding conditions are minutely different for each recording medium at the stage of their manufacturing. Therefore, even if a light beam is projected, at an optimum irradiation beam intensity, to the optical disc, information is not always recorded at the optimum irradiation beam intensity. In this state, it is difficult to secure a good uniformity of the accuracies of recording information into and reading out it from the optical recording medium.

To cope with this, a disc player for recording information into and reproducing it from the optical recording medium of this type, performs an optimum power calibration (OPC) for setting an irradiation intensity of a laser beam at an optimum value before starting an information recording operation.

Figure 7A:
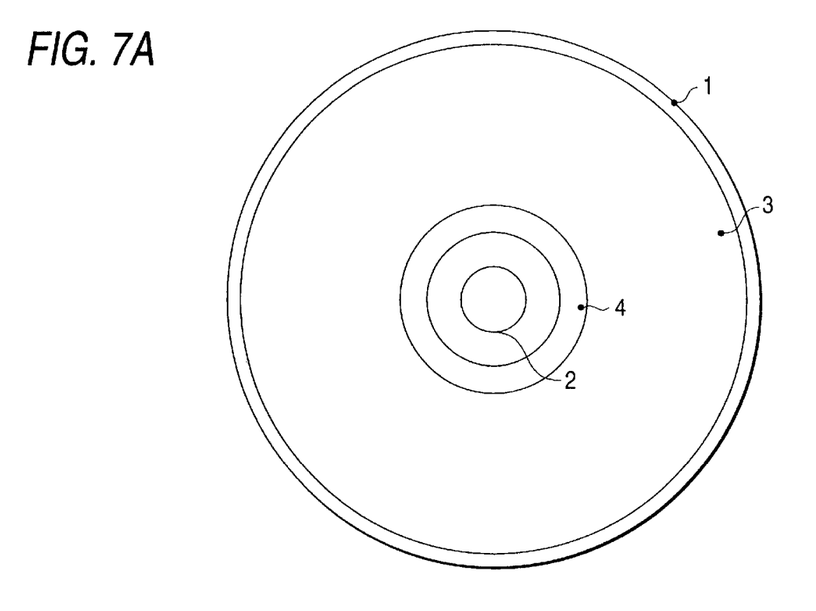
FIGS. 7A and 7B are diagrams showing a disc-like optical recording medium and a conventional beam recording power variation with respect to the disc radius.

The CD-R, for example, is provided with a power calibration area (PCA) 4 as shown in FIG. 7(a). The power calibration area 4 is located between a center hole 2 of an optical recording medium 1 and an information recording area 3. More precisely, it is located on the outer peripheral side of the center hole 2 and within the innermost periphery of the information recording area 3. Before information is recorded into the information recording area 3, test data is recorded into the power calibration area 4 of the recording medium, and an optimum disc irradiation beam intensity is determined on the basis of the recording test.

The OPC effectively operates when it is applied to such an optical recording medium 1 which ensures an optimum recording of information thereinto even when information is recorded into the entire recording area 3 of a disc-like optical recording medium 1 with a laser beam being fixed at an optimum disc irradiation beam intensity. In this case, an intensity of the laser beam, which is different from an optimum power determined by the recording test, which is applied to the power calibration area 4, is required for the optimum recording of information into the power calibration area 4 in the following cases. A first case is that the optimum disc irradiation beam intensity gradually increases from the inner side to the outer side (when viewed in the radial direction) of the recording area 3 of an optical recording medium 1 since a recording sensitivity is not uniform over the recording area 3 (as indicated by a straight line upwardly obliquely extending to the right in FIG. 7(b)). A second case is that the disc player, while being in power-on state, is left for a long time, and temperature in the disc player rises, the characteristic (I-P characteristic) of the laser diode varies, and the irradiation intensity of the laser beam is reduced (as indicated by a straight line downwardly obliquely extending to the right).

Figure 7B:
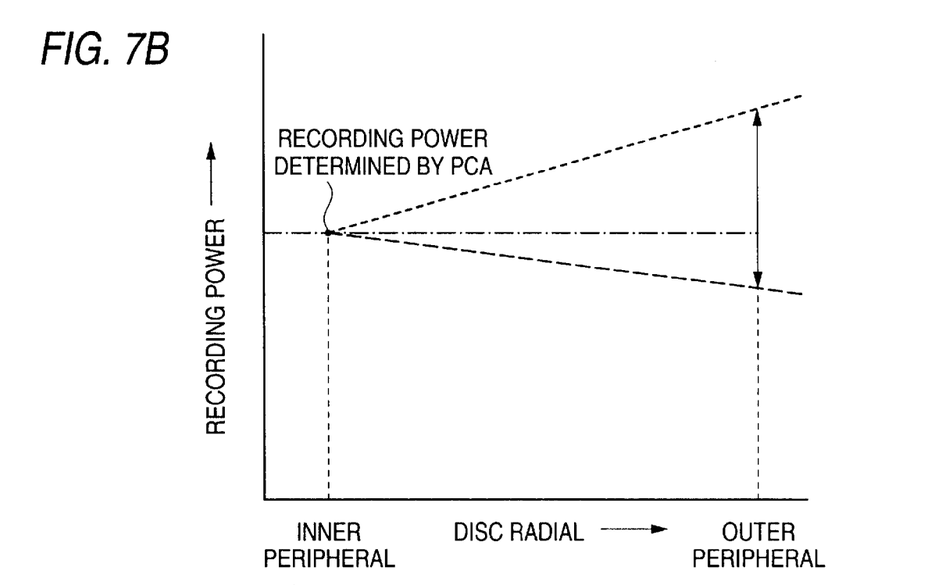

In the first case, an irradiation intensity of the laser beam required in the outer region (when radially viewed) of the optical recording medium 1 is larger than that in the inner region thereof.

When the laser beam of a fixed irradiation intensity, which is determined on the basis of the result of the recording test performed by use of the power calibration area 4 of the optical recording medium 1, is used for recording information into the entire recording area 3 of the optical recording medium 1, the light intensity of the laser beam becomes insufficient toward the outer side of the recording medium. Therefore, the information recording accuracy becomes deteriorated toward the outer side of the recording medium.

In the case of the phase-change type recording medium, such as a CD-RW, the rewriting of information into the recording medium is impossible. Further, the recording medium is limited in its power calibration range, so that the number of test recording operations is limited. As a result, an inconvenient situation occurs in which a testable area runs out in the power calibration area in a state that the information recordable area is still left in the recording area 3. In this situation, no recording test can be performed, and the information recording at an improper irradiation intensity of the light beam is inevitable.

SUMMARY OF THE INVENTION

Accordingly, an object of the present invention is to provide a disc player which is capable of recording information in the entire recording area of a disc-like optical recording medium at an optimum irradiation intensity of the laser beam, thereby improving an information recording accuracy.

According to the present invention, there is provided a disc player having laser output control means which controls a laser output power of a laser device at the time of actually recording information in a disc-like optical recording medium, in accordance with light being reflected from the recording medium in a recording test mode. The disc player is improved such that recording test is performed during a recording stand-by time period, which is yielded by a difference between an information transmittal rate in inputting information to the disc player and an information recording rate in recording information into the optical recording medium ((claim 1).

In the thus constructed disc player, the optical recording medium is a rewritable optical disc having rewriting capabilities, and the recording test is performed by use of a recording area of the optical recording medium into which information is recorded (claim 2).

In the disc player, the recording test is conducted by use of a recording area of one recording unit into which information is recorded (claim 3).

The disc player of the invention performs a recording test by the utilization of a stand-by period yielded by a difference between the data rate in inputting information to the disc player and a recording rate in recording information into the optical recording medium. The laser output control means an irradiation intensity of a laser beam for actually recording information on the basis of the result of the recording test. By the beam power control, an optimum recording of information over the entire information recording area of the optical recording medium is secured.

The optical recording medium used for the disc player is of the rewritable type. Therefore, information may be rewritten into the recording surface of the optical recording medium which contains information already recorded therein. The recording test is performed by use of the recording area into which information is recorded. Because of this, there is no limit in the number of test recording operations. Further, the recording test is performed by use of the recording area of one recording unit. Therefore, there is no chance that the test recording adversely affects the adjacent recording areas.

DETAILED DESCRIPTION OF THE PREFERRED EMBODIMENTS

The preferred embodiment of a disc player according to the present invention will be described with reference to FIG. 1.

In the embodiment, the invention is incorporated to a disc player for recording and reproducing information to and from an optical recording medium of the phase change recording type by means of an optical pickup device. A typical example of this type of the optical recording medium is a DVD-RW (DVD-rewritable) disc. The DVD-RW disc uses a phase change recording method for recording and reproducing information to and from the disc itself. A unique function of this optical disc is that information may be rewritten into the disc while erasing old information already recorded thereinto.

Figure 1:
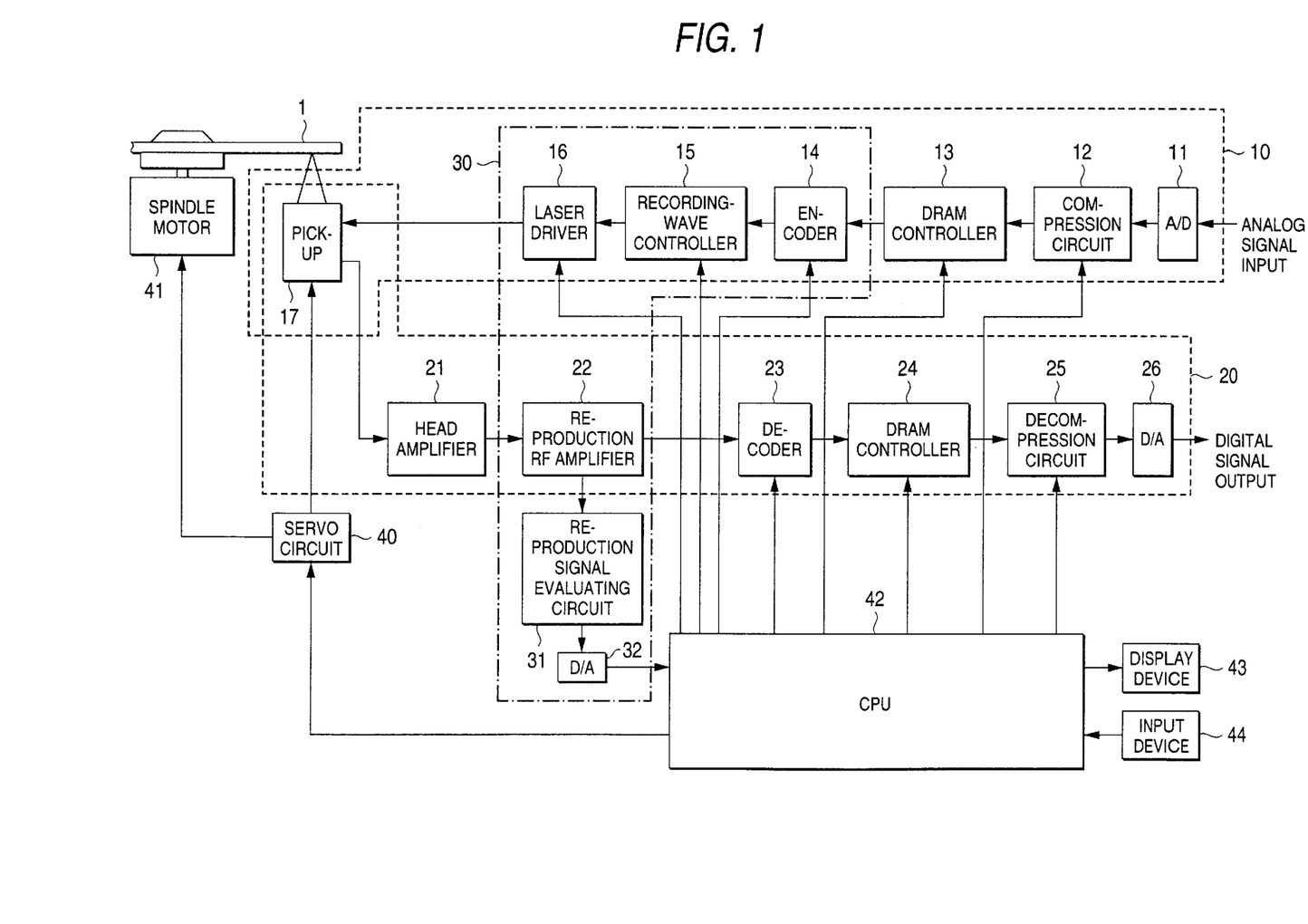
FIG. 1 is a block diagram showing an overall arrangement of a disc player incorporating the present invention.

An overall construction of a disc player 50 incorporating the present invention is shown in FIG. 1. As shown, the disc player 50 is generally made up of a recording system 10, a playback or reproducing system 20, laser-output controller 30, and a servo circuit 40.

The recording system 10, which functions to record information into a disc-like optical recording medium 1, includes an A/D convertor 11, a compression circuit 12, a DRAM controller 13 for recording which contains a DRAM for recording, a recording-wave controller 15, a laser driver 16 and an optical pickup device 17.

The reproducing system 20, which functions to reproduce already-recorded information from the optical recording medium 1, includes the pickup 17, a head amplifier 21, a reproduction RF amplifier 22, a decoder 23, a DRAM controller 24 for reproducing which contains a DRAM, an expansion circuit 25, and a D/A convertor 26.

The laser-output controller 30 as laser-output control means includes the encoder 14, the recording-wave controller 15 and the laser driver 16 (of the recording system 10), the reproduction RF amplifier 22 (of the reproducing system 20), a reproduction-signal evaluating circuit 31 connected to the reproduction RF amplifier 22, and an A/D convertor 32.

The servo circuit 40 controls a searching operation of the optical pickup device 17, positioning operations (for focusing and tracking) of an objective lens of the optical pickup device 17, and a rotating speed of a spindle motor 41.

The servo circuit 40 operates in accordance with control signals output from a CPU 42. The disc player 50 further includes a display device 43 and an input device 44. When information is recorded into the optical recording medium 1, operation commands are displayed on the screen of the display device 43, and input to the disc player by means of the power calibration area 4.

The operation of the thus constructed disc player 50 will be described. An operation of the recording system 10 will first be described.

Information to be recorded into the optical recording medium 1 is input to an input terminal (not shown) of the disc player 50. An example of the information is image information (electrically takes the form of analog signal) output from a TV set. The image information is input to the A/D convertor 11 where it is converted into corresponding digital data, and the resultant is applied to the compression circuit 12.

The compression circuit 12 compresses the digitized image data, and supplies the compressed digital image data to the DRAM controller 13. MPEG (moving picture experts group) 2 and MP@ML may be used for this image data compression.

The DRAM controller 13 write the digital data at a predetermined data rate into the DRAM (data rate: a writing rate at which information is written into the DRAM). When the CPU 42 detects that a predetermined amount of data (=one recording unit) has been recorded in the DRAM, it reads out the digital data from the DRAM and sequentially supplies it to the encoder 14.

The data rate to read out the digital data from the DRAM is equal to an encoding rate to encode the digital data according to the MPEG or MP@ML method. This data rate is equal to a data recording rate used for recording information into the optical recording medium 1.

The encoder 14 receives the digital data from the DRAM controller 13, encodes it, modulates it with an EFM signal into an RF signal, and supplies the RF signal to the recording-wave controller 15. The recording-wave controller 15 receives the RF signal, modulates and waveshapes, and supplies the resultant to the laser driver 16. The laser driver 16 processes the waveshaped signal to form a drive signal to drive a semiconductor laser device of the optical pickup device 17.

In response to the drive signal, the semiconductor laser device of the optical pickup device 17 emits a high-power laser beam onto the recording surface of the optical recording medium 1 for recording information thereinto.

The laser beam records information in the recording surface of the optical recording medium 1. As already referred to, the optical recording medium 1 is of the phase change type in which the recording, reproducing, erasing and rewriting of information is carried out by the utilization of the reversible phase change of a recording layer (of the recording surface) on the optical recording medium, viz., a physical state change of the recording layer between a crystalline state and an amorphous state by irradiating the recording layer with a laser beam.

The operation of the reproducing system 20 will be described.

The optical pickup device 17 emits a laser beam being kept at such a low power as not affect the physical state of the optical recording medium 1, onto the recording surface thereof. A photo sensor of the optical pickup device 17 senses a variation of a quantity of laser light reflected from the recording surface of the optical recording medium 1, and converts it into a corresponding electrical signal and outputs it as an RF signal. The RF signal enters the head amplifier 21 and then the reproduction RF amplifier 22.

The control of the disc irradiation beam intensity of the laser beam is effected at the time of reproducing as well as at the time of recording by the CPU 42. Also at the time of reproducing, a control signal is applied from the CPU 42 to the laser driver 16 which in turn produces a drive signal to the optical pickup device 17.

The reproduction RF amplifier 22 amplifies the RF signal and applies the resultant to the decoder 23. The decoder 23 demodulates the RF signal, decodes it into compressed digital data, and supplies it to the DRAM controller 24.

The DRAM controller 24 sequentially writes the digital data into its DRAM. The digital data is sequentially read out of the DRAM at a predetermined rate in accordance with an expansion processing by the expansion circuit 25, and then fed into the expansion circuit 25. The expansion circuit 25 expands the compressed digital data, and applies the expanded digital data to the D/A convertor 26 which in turn converts the digital data into a corresponding analog data signal, and outputs it to an exterior device. The writing rate at which the digital data is written into the DRAM of the DRAM controller 24 is set be slightly larger than the reading rate. For this reason, when the amount of data accumulated in the DRAM of the DRAM controller 24 reaches an upper limit of data amount, the reading operation of information from the optical recording medium 1 is interrupted.

Thereafter, the amount of the data recorded in the DRAM decreases to a lower limit of data amount with reading out the data from the DRAM. At this time, the reading of information from the optical recording medium 1 starts again. In this way, the operation of reading information from the optical recording medium 1 is controlled while monitoring the accumulated data amount in the DRAM.

The operation of the laser-output controller 30 will be described.

In the disc player 50, before it records information into the optical recording medium 1, a recording test is performed. In the test, a calibration pit pattern (CAL pattern) is recorded into the optical recording medium 1 with a laser beam at a predetermined irradiation intensity. The CAL pattern is then reproduced from the optical recording medium 1. The reproduced CAL pattern is evaluated. A disc irradiation beam intensity at which information is to be recorded into the optical recording medium 1 is controlled in accordance with the evaluation result. The laser-output controller 30 carries out the control of the disc irradiation beam intensity.

The operations of the encoder 14, the recording-wave controller 15 and the laser driver 16 of the recording system 10 when image information received from an exterior device is recorded into the optical recording medium 1 are different from the operations of them when the CAL pattern is recorded into the optical recording medium 1 for the recording test. This will be described in detail with reference to FIGS. 2A and 2B.

Figure 2A:
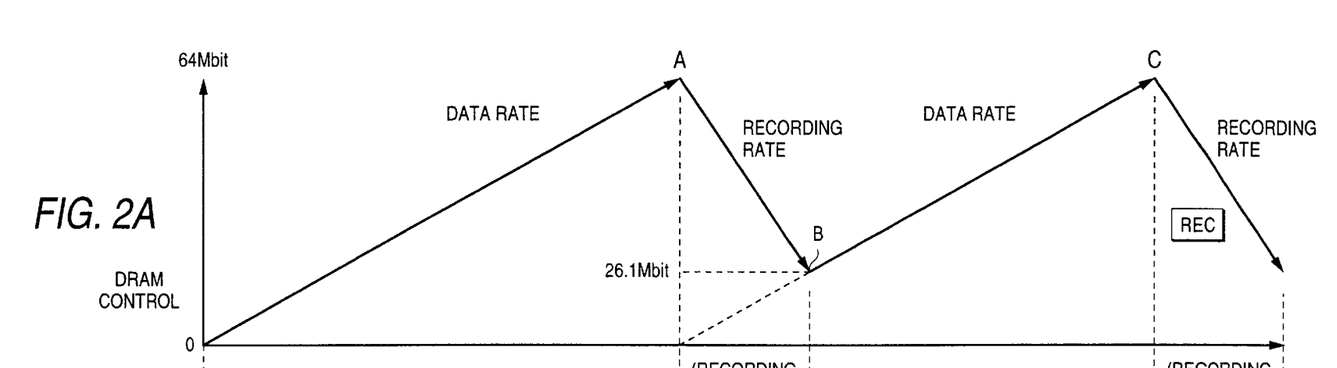
FIGS. 2A and 2B are diagrams showing a model of a DRAM control and a pickup-device control in a time-sequential and corresponding manner.
Figure 2B:
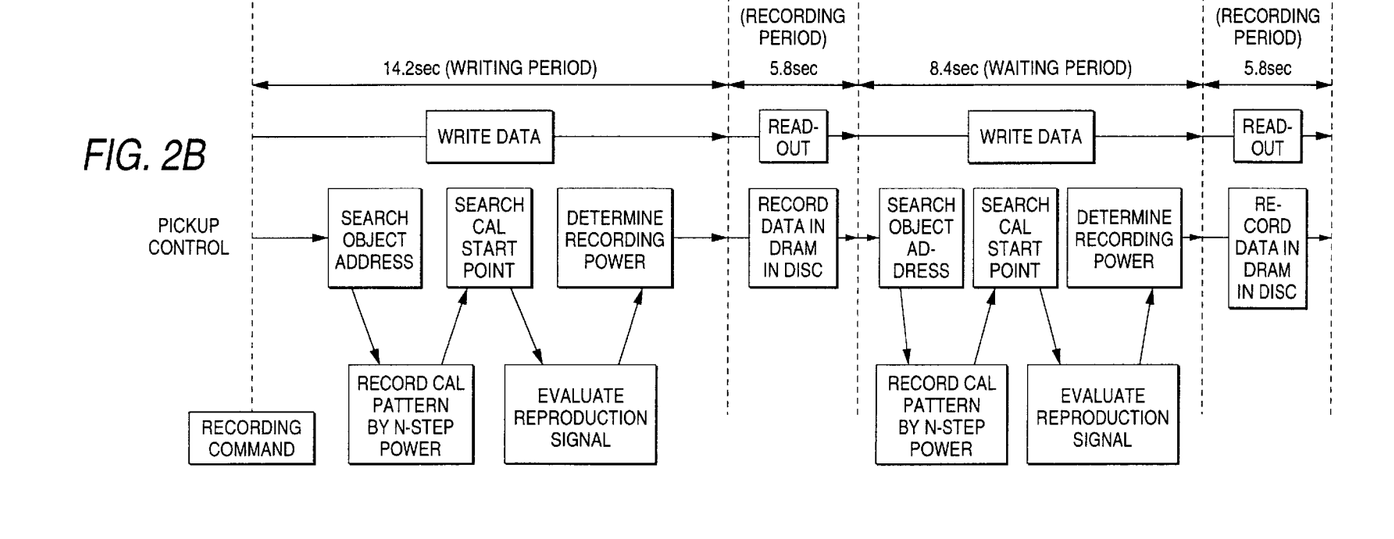

FIGS. 2A and 2B are diagrams showing a model of the controls (writing and reading controls) of the storage capacity of the DRAM of the DRAM controller 13 and the control of the operation of the optical pickup device 17 when information is recorded into the optical recording medium 1 in a time-sequential and corresponding manner. FIG. 2A shows a variation of the storage capacity of the DRAM when data is written into and read out of the DRAM (=DRAM control). The ordinate of the graph of FIG. 2A represents the storage capacity (Mbit) of the DRAM, and the abscissa represents time (sec.).

When image information at 720 pixels×480 pixels (resolution) is processed by the MPEG, MP@ML method, the resultant encoding rate is 4 Mbps to 5 Mbps.

For this reason, in the disc player 50, a data rate is set at 4.5 Mbps when digital data is written into the DRAM, and a recording rate is set at 11.08 Mbps when digital data is read out of the DRAM, it is encoded, and recorded into the optical recording medium 1. Further, a maximum storage capacity of the DRAM is set at 64 Mbit. The thus specified disc player 50 will be discussed in the following description.

The DRAM control by the DRAM controller 13 will be described with reference to FIG. 2A.

(1) When digital data is written at the data rate of 4.5 Mbps into the DRAM of 64 Mbit (storage capacity), a time period (0–A in FIG. 2A) for writing digital data is 14.2 sec. as given by 64(Mbit)/4.5(Mbit)=14.2(sec.)

(2) A time period (A–B in FIG. 2A) for reading out digital data from the DRAM is a period of time that the digital data is read out and the next digital data is written into the optical recording medium 1.

During this period, digital data of 64 Mbit is read out at the data rate of 11/08 Mbps from the DRAM, while at the same time new digital data is written into the same at the data rate of 4.5 Mbps.

Assuming that the A–B period is t, the following equation holds $$64(\text{Mbit})-(11.08-4.5)t=4.5t$$

Rearranging the equation for t, then we have $$t=64(\text{Mbit})/11.08(\text{Mbit})=5.8(\text{sec.})$$

From this, it is seen that the period to recording digital data into the optical recording medium 1 is 5.8 sec.

(3) A time period (B–C in FIG. 2C) is a period of time where the reading of digital data from the DRAM is interrupted and new digital data is written into the same. At a time point B where the data reading is interrupted, new digital data has been written into the DRAM. Therefore, the data in the DRAM is not zero in amount.

The amount of data already recorded into the DRAM is 26.1 Mbit as given by $$5.8(sec.) \times 4.5(Mbit) = 26.1(Mbit)$$

Therefore, a time period (B–C in FIG. 2A) to write digital data into the remaining storage capacity of the DRAM is 8.4 sec. as given by $$(64(Mbit) - 26.1(Mbit))/4.5(Mbps)$$

In this way, the DRAM control is carried out by repeating a sequence of the writing periods (0–A=142 sec.) and (B–C=8.4 sec.) and the reading periods (A–B, and C–D, each is 5.8 sec.). The control sequence is repeated till the recording operation of image information into the optical recording medium 1 terminates.

As described above, the disc player 50 reads information from the DRAM and drives the encoder 14, the recording-wave controller 15 and the laser driver 16 and sequentially writes it into the optical recording medium 1 by the optical pickup device 17. Therefore, no information is written into the optical recording medium 1 during the period where digital data is not read out of the DRAM, and the optical pickup device 17 is put in a stand-by state during this period.

A difference between the writing period to the DRAM and the reading period to it, viz., the stand-by period of the optical pickup device 17, (8.4 sec.=14.2 sec.–5.8 sec.), is used for the recording test to be described later.

FIG. 2B shows the control of the optical pickup device 17 when the recording is performed during the stand-by period.

Since a writing period is 14.2 sec. in an initial state of the DRAM, a first recording test is carried out, viz., a CAL pattern is written into the optical recording medium 1. A second recording test and the subsequent ones are each carried out during the stand-by period (8.4 sec.).

During the stand-by period, the disc player 50 performs a sequence of controls of "target address research", "CAL pattern recording", "CAL pattern recording area search", "reproduction signal evaluation" and "recording power determination". Then, it reads out digital data from the DRAM, encodes it by the encoder 14, and drives the recording-wave controller 15 and the laser driver 16 to record information into the optical recording medium 1 by the optical pickup device 17.

The detail of the operation of the optical pickup device 17 in the recording test mode will be described later.

The disc player 50 of the embodiment is thus constructed and each functional block of the disc player is thus operated.

An operation of the disc player 50 will be described when it records information into the optical recording medium 1.

Figure 3:
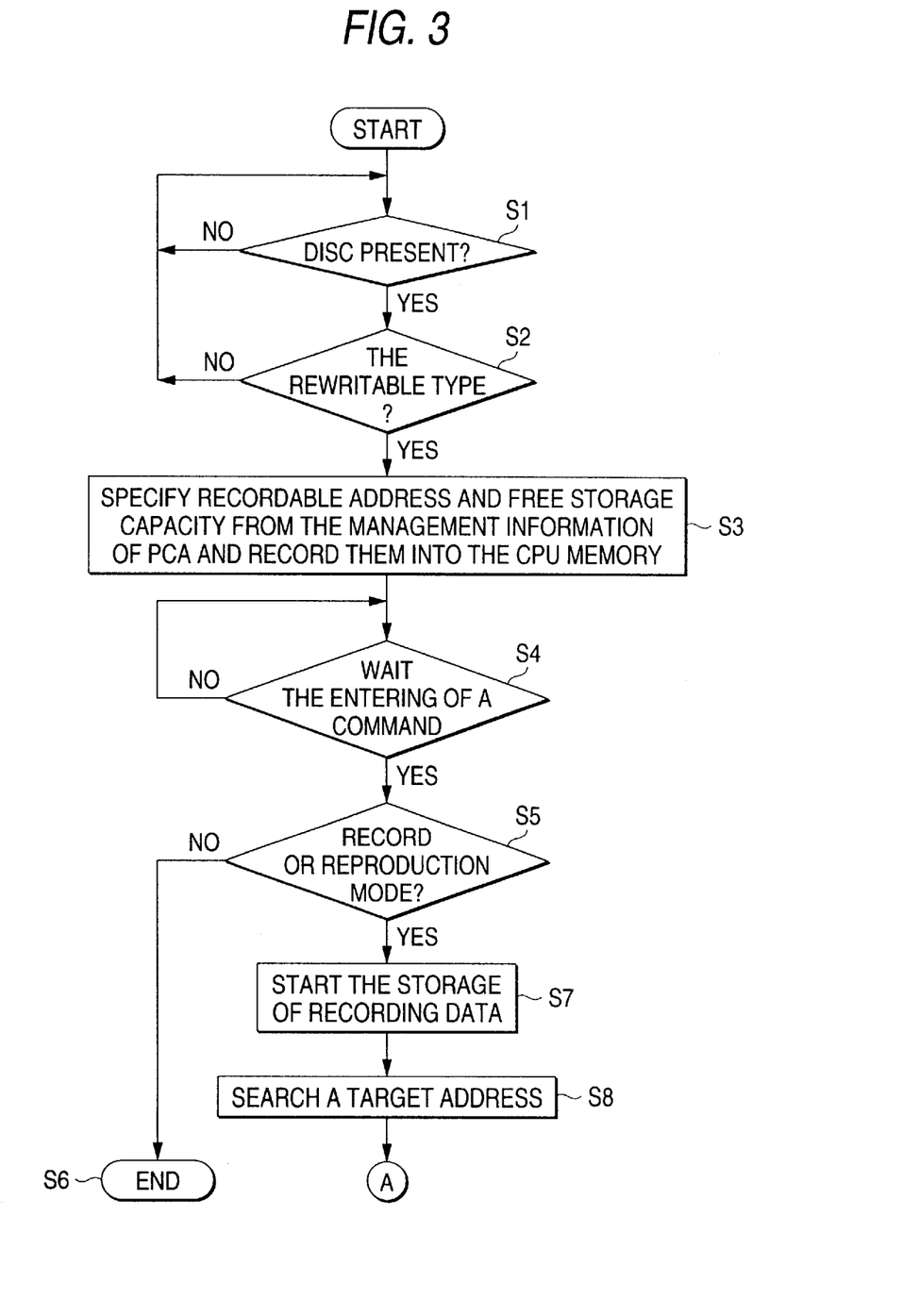
FIG. 3 is a flow chart showing a first half of a disc-player operation program.
Figure 4:
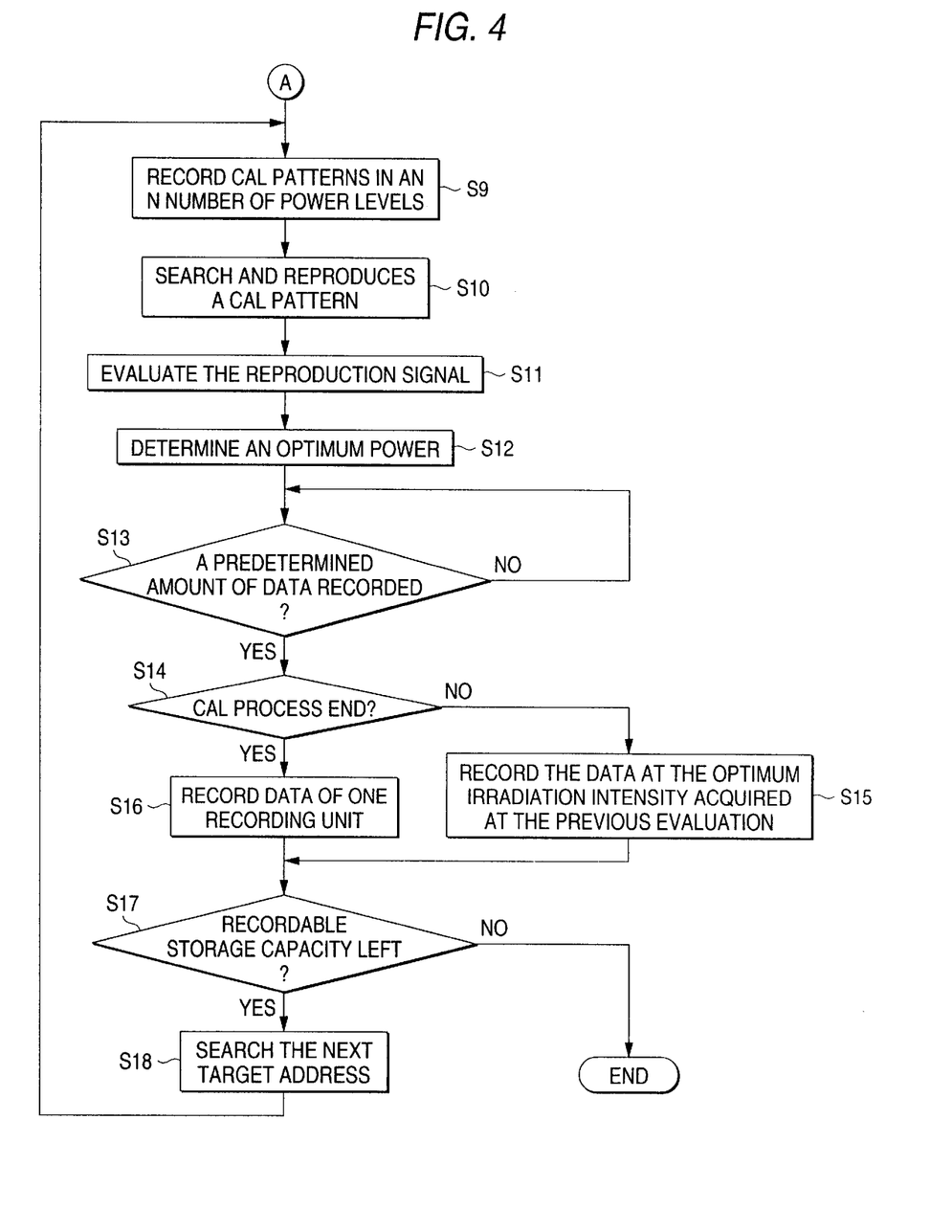
FIG. 4 is a flow chart showing a second half of a disc-player operation program.

FIGS. 3 and 4 cooperate to show an operation program which is prerecorded in the CPU 42 and executed when the disc player 50 records information into the optical recording medium 1.

As described above, the disc player 50 is capable of recording and reproducing information to and from the optical recording medium 1 of the rewritable type. Accordingly, when a power switch (not shown) of the disc player 50 is turned on and an optical recording medium 1 is set at a predetermined position, then the disc player 50 interactively guides an operator with the aid of the display device 43 to select the recording of information into the optical recording medium 1 or the reproducing of information from the optical recording medium 1.

The flow chart shown in FIG. 3 uses START and steps S1 to S5 for a determining process for the disc player 50 to determine a record mode to record information into the optical recording medium 1 or a reproduction mode to reproduce information from the same. Also in the flow chart, when an operator selects a "reproduction mode" in a step S5, the processing of the program ends for the reasons that the present invention is directed to an information recording method by the disc player 50, and that the reproduction mode of the optical recording medium 1 is similar to the DVD reproduction mode.

Now, the operation of the disc player 50 will be described with reference to FIGS. 3 and 4.

Upon power on, the CPU 42 executes a step S1 to check if the optical recording medium 1 is set or inserted to the disc player 50 by an output signal of a disc sensor (not shown). If it is not set to the disc player (the answer is NO), the CPU 42 causes the display device 43 to display a message "No disc" or "Insert a disc.", and continues the message display till the optical recording medium 1 is inserted into the disc player 50 and the disc sensor detects the insertion of the disc. When the recording medium 1 is inserted into the disc player 50 and the disc sensor detects the insertion of the disc, the CPU 42 advances to a step S2. In this step, the CPU 42 drives the servo circuit 40 to move the optical pickup device 17 to the PCA (power calibration area 4) located at the innermost periphery of the optical recording medium 1. The CPU 42 applies a related control signal to the optical pickup device 17 when it reaches the PCA. In turn, the optical pickup device 17 make an access to the management information of the PCA by irradiating there with a laser beam, acquires an RF signal therefrom and supplies it to the decoder 23, through the head amplifier 21 and the reproduction RF amplifier 22.

Then, the decoder 23 demodulates and decodes the RF signal, and supplies the resultant to the CPU 42. The CPU 42 judges whether or not the inserted optical recording medium 1 is of the rewritable type, from the acquired management information.

If it is not of the rewritable (the answer is NO, S2), the CPU 42 causes the display device 43 to display a message "Insert a rewritable type disc.", and returns to a step S1, and repeats the execution of the steps S1 and S2 till the rewritable disc is inserted. When the rewritable disc is inserted (the answer is YES, S2), the CPU 42 advances to a step S3. In this step, the CPU 42 specifies a recordable address or addresses and a free storage capacity from the management information of the PCA of the optical recording medium 1, and records them into its memory. And the CPU 42 advances to a step S4.

In the step S4, the CPU 42 causes the display device 43 to display a message "Enter an operation command.", and waits for the entering of the operation command from the input device 44. If no operation command is input (the answer is NO, S4), the CPU 42 maintains the waiting of the step S4. If the operation command is input (the answer is YES, S4), the CPU 42 advances to a step S5, and judges whether or not the input operation command is a "record mode". If the operation command is a mode other than the record mode, for example, "reproduction mode" (the answer is NO, S5), the CPU 42 enters a control for exercising the specified mode.

If the operation command is a "record mode" (the answer is YES, S5), the CPU 42 advances to a step S7.

In this step, the CPU 42 causes the DRAM controller 13 to start the writing of digital data received from an external device into the DRAM contained in the DRAM controller 13 (point 0 in FIG. 2A), and then progresses to a step S8.

A test recording process ranges from the step S8 to a step S12 in the flow chart. (The test recording process is. carried out during the record waiting period (B–C) shown in FIG. 2B.) In this process, operations of "target address search", "CAL pattern recording", "CAL pattern recording area search", "reproduction signal evaluation" and "recording power determination" are sequentially performed. The operations of the steps in the flow chart will be described.

Figure 5:
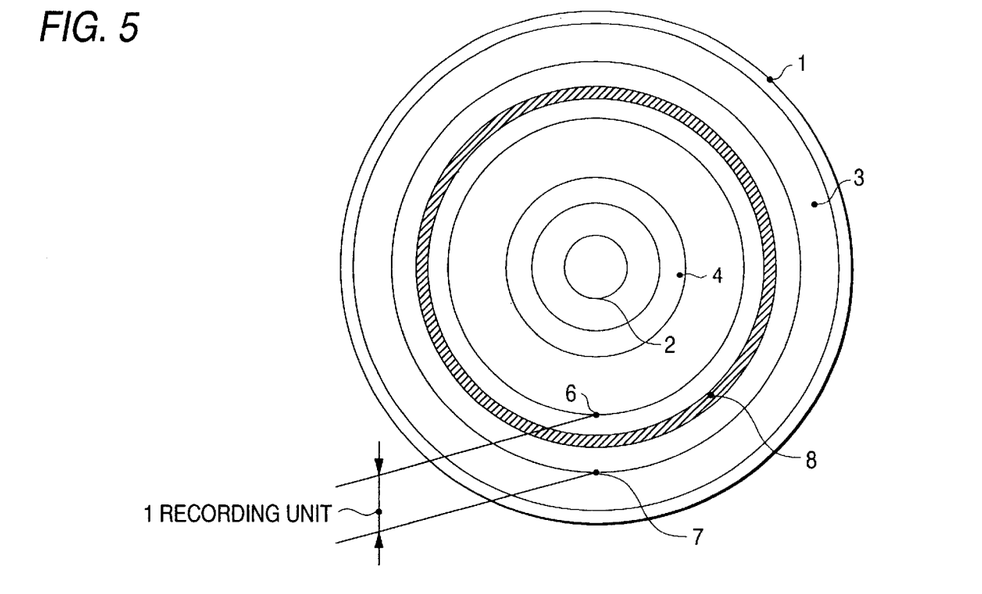
FIG. 5 is a diagram showing a state of an optical recording medium when a test pattern and information of one recording unit is recorded in the recording area of the optical recording medium.

FIG. 5 shows a model of a state of the optical recording medium 1 when digital data of one recording unit is recorded into the information recording area 3 of the optical recording medium 1.

In the description to follow, a start address 6 is set at a first recording position on a track in the information recording area 3 when new digital data is recorded into the optical recording medium. A last address 7 is set at a data terminating position on the track in the information recording area 3. The data terminating position is a position where the digital data of one recording unit terminates when the digital data is consecutively recorded into the track while starting at the start address 6. A target address 8 is set at a mid position between the start address 6 and the last address 7.

The one recording unit is a predetermined amount of data, and used for ascertaining the amount or of data when data is recorded into the DRAM. A storage capability of a track in the optical recording medium 1 is also a predetermined value. Therefore, when an address on the optical recording medium 1 is set at a start address 6, the target address 8 can be determined in a manner that the CPU 42 counts the addresses required when the digital data of one recording unit is recorded into the track while starting at the start address 6. At the same time, the last address 7 is counted.

Accordingly, the CPU 42 sets a recordable, first address at the start address 6 on the basis of the management information of the PCA (power calibration area) 4 of the optical recording medium 1, and obtains an address reached when the half of one recording unit is recorded starting at the start address 6 by its counting, to thereby determine the target address 8. In the step S8, the CPU 42 drives the servo circuit 40 to move the optical pickup device 17 to the target address 8. The CPU 42 detects that the optical pickup device 17 reaches the target address 8, and advances to a step S9.

An N number of power levels and M number of CAL patterns are recorded in advance in the memory of the CPU 42.

The power is determined in connection with an amplitude of an RF signal produced by reproducing information of a predetermined pattern, which is pre-recorded into a preselected reference optical recording medium 1 by use of a laser beam at a predetermined irradiation intensity. The medium irradiation beam intensities are recorded in advance in the memory of the CPU 42 in the form of an N number of power levels and an N number of corresponding different amplitude values.

In the recording test, one power level is selected from the N number of those recorded power levels, the optical recording medium 1 is irradiated with a laser beam of the selected power level, to thereby produce an RF signal. An amplitude of the RF signal is compared with the predetermined value. If the former is smaller than the latter, it is evaluated that a physical sensitivity of the recording surface of the optical recording medium 1 when it receives a laser beam is lower than that of a reference recording material. Conversely, when the former is higher than the latter, it is evaluated that the physical sensitivity of the recording surface is smaller than that of the reference recording material.

The CAL pattern follows. An M number of pit patterns, which include repetitive patterns of long and short pits each being fixed in length or random patterns of long and short pits each being not fixed in length, are recorded in a reference disc-like optical recording medium 1, previously selected. An error rate and jitter of the M number of pit patterns, which are reproduced from the reference optical recording medium 1, are measured. Values related to the N number of power levels, which minimize the error rate and jitter are recorded in advance in the memory of the CPU 42, in the form of digital data.

The optical pickup device 17 performs a recording test in response to a control signal from the CPU 42. In the test, the M number of pit patterns are recorded into the location of the target address 8 on the recording surface of the optical recording medium 1 with light beams of the N number of power levels.

When detecting the end of the test, the CPU 42 records the digital data at the target address 8 and the last address 7 into the PCA 4, and advances to a step S10.

The "target address search" and "CAL pattern recording" in FIG. 2B are thus carried out.

CAL pattern reproducing operations on "CAL pattern recording area search", "reproduction signal evaluation" and "recording power determination" shown in FIG. 2A will be described.

In a step S10, the CPU 42 reproduces a pit pattern as a CAL pattern from the target address 8 by the optical pickup device 17, and supplies an RF signal produced by the pit pattern reproduction to the reproduction-signal evaluating circuit 31, through the head amplifier 21 and the reproduction RF amplifier 22. In the next step S1, the reproduction-signal evaluating circuit 31 applies the RF signal received to the A/D convertor 32. In turn, the convertor 32 converts an amplitude of the RF signal into corresponding digital data, and sends the resultant to the CPU 42.

The CPU 42 compares the amplitude values of the RF signals corresponding to the M number of pit patterns with the predetermined amplitude value of the RF signal, pre-recorded in its memory, and selects the amplitude value closest to the predetermined value, viz., the power level defined by the selected amplitude value.

The optical pickup device 17 reproduces the pit pattern of the CAL pattern recorded at the target address 8, and supplies an RF signal resulting from the reproduction to the decoder 23, through the head amplifier 21 and the reproduction RF amplifier 22. The decoder 23 demodulates, decode and compresses the received RF signal, and supplies it in the form of digital data to the CPU 42.

The CPU 42 measures the error rate and the jitter of the received CAL pattern, and selects the power level, which minimizes the error rate and jitter. When the power level of which the amplitude value is closest to the predetermined amplitude value is different from the power level minimizing the error rate and jitter, the CPU 42 selects the latter power level, and determines it as the optimum power level (step S12)

After the optimum power is determined, the CPU 42 records the optimum power number (stepped in N number) and the type of pit pattern into the PCA 4, and advances to a step S13.

In the step S13, the CPU 42 judges whether or not a predetermined amount of digital data has been recorded into the DRAM of the recording, DRAM controller 13. If the answer is NO, the CPU 42 continues the execution of this step S13. If the answer is YES (the predetermined amount of digital data has been recorded into the DRAM), the CPU 42 advances to a step S14 when the point A or C (FIG. 2A) is reached, and judges whether or not the execution of the process of a sequence of steps S8 to S12 has completed.

When the writing of a predetermined amount of data has been completed in the step S13, but the recording test process is not yet completed (answer is NO, in the step S14), the CPU 42 considers that some trouble occurs, for example, the evaluation in the recording test is not yet completed, and advances to a step S15. In this step, the CPU 42 records the data of one recording unit with a laser beam of the optimum irradiation intensity acquired at the previous evaluation.

If the CAL process has been completed in step S14 (answer is YES), the CPU 42 goes to a step S16, and records the data of one recording unit with a laser beam of the optimum irradiation intensity determined in the step S12.

Operations to record the digital data (S15 and S16) will be described.

In those steps S15 and S16, the CPU 42 instructs the recording, DRAM controller 13 to read out digital data of one recording unit from its DRAM. Then, it supplies the readout digital data to the encoder 14. The encoder 14 encodes the digital data at an encoding rate, and supplies it as a modulated RF signal to the laser driver 16, through the recording-wave controller 15.

The CPU 42 controls the laser driver 16 in accordance with the evaluation result of the recording test, recorded in the PCA 4 (the previous evaluation result in the step S15, and the evaluation result determined by the present step S12 in the step S16). Through the control, an optimum medium irradiation beam intensity is secured.

In response to a control signal from the CPU 42, the optical pickup device 17 starts the recording of digital data of one recording unit at the start address 6.

When detecting that the writing of the digital data of one recording unit is completed, the CPU 42 advances to a step S17. In this step, it reads out the management data from the PCA 4, and judges whether or not there is left a recordable storage capacity.

When such a storage capacity is not left (NO), the CPU 42 ends the execution of the process.

If it is left (YES), the CPU 42 goes to a step S18, calculates an address at which the half of one recording unit was recorded into the location of the present last address, and uses it as the next target address.

The CPU 42 drives the optical pickup device 17 to search the next target address, and repeats the sequence of the step S9 and the subsequent ones.

As described above, the disc player 50 constructed according to the present invention performs a recording test every time information of one recording unit is recorded into the optical recording medium 1; reproduces the data by the recording test; evaluates the reproduction signal; determines an optimum power of the laser beam; and records information into the optical recording medium. Therefore, information can be recorded uniformly over the entire information recording area 3 of the optical recording medium 1.

Figure 6:
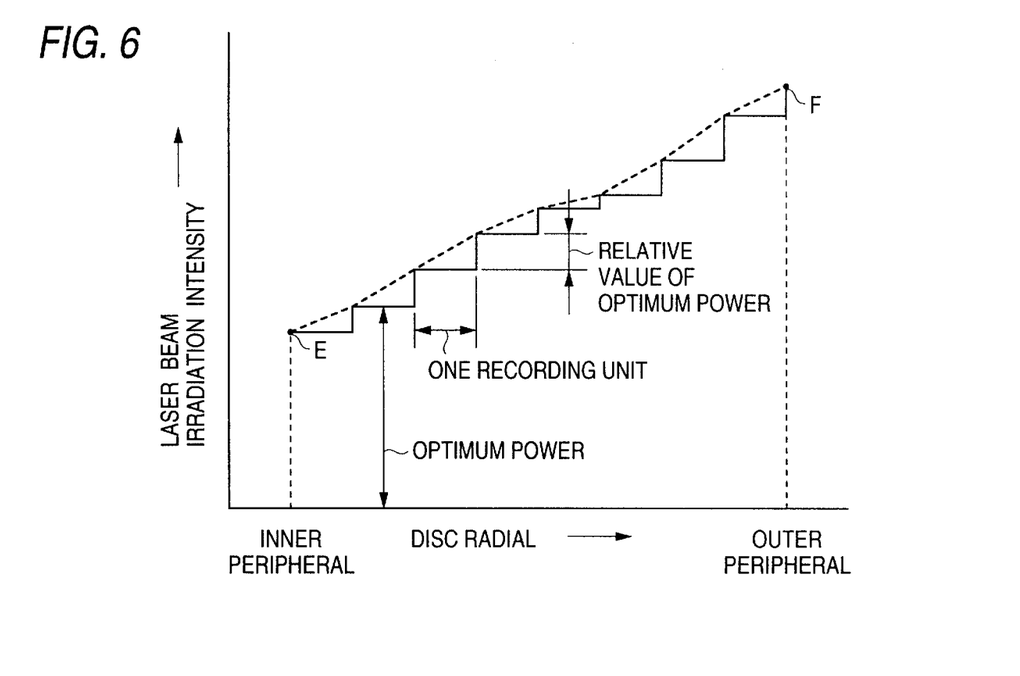
FIG. 6 is a graph typically showing the setting of the laser beam at the optimum power levels respectively for the recording areas on the optical recording medium.

FIG. 6 is a graph typically showing the setting of the laser beam at the optimum power levels respectively for the recording areas on the optical recording medium.

In the graph, the ordinate represents optimum irradiation intensities of a laser beam projected to the optical recording medium 1, and the abscissa represents the radium of the optical recording medium 1.

The optical recording medium 1 for FIG. 1 is of the type in which the irradiation intensity must be gradually increased from the inner peripheral side to the outer peripheral side of the recording medium.

The horizontal part of each step in the graph of FIG. 6 represents the information recording area 3 of one recording unit, and the vertical part of the step represents a relative value of the optimum power level of the present track to its adjacent track.

In the embodiment, the reproduction-signal evaluating circuit 31 applies the RF signal to the A/D convertor 32, and the convertor 32 converts it into corresponding digital data and supplies it to the CPU 42. Alternatively, a level comparator capable of handling the N number of predetermined values may be contained in the DRAM controller 13. In this case, the result of the comparison is applied to the A/D convertor 32, and then to the CPU 42.

In the embodiment, the digital data of the optimum power levels recorded in the PCA 4 are rewritten. In an alternative, the results of all the recording tests for the entire information recording area 3 may be recorded in the PCA 4.

While the invention is applied to the disc player for recording and reproducing information to and from the optical recording medium of the phase-change recording type, it may be applied to a disc player handling a magnetic optical recording medium.

As seen from the foregoing description, the disc player of the invention performs a recording test by the utilization of a stand-by period yielded by a difference between the data rate in inputting information to the disc player and a recording rate in recording information into the optical recording medium. The laser output control means an irradiation intensity of a laser beam for actually recording information on the basis of the result of the recording test. By the beam power control, an optimum recording of information over the entire information recording area 3 of the optical recording medium is secured.

What is claimed is:

1. A disc player, comprising:
   a laser device; and
   laser output control means for controlling a laser output power of said laser device at the time of actually recording information in a disc-like optical recording medium according to light being reflected from said recording medium in a recording test mode;
   wherein a recording test is performed during a recording stand-by time period, which is yielded by a difference between an information transmittal rate in inputting information to said disc player and an information recording rate in recording information into said optical recording medium.

2. The disc player according to claim 1, wherein said optical recording medium is a rewritable optical disc having rewriting capabilities, and said recording test is conducted by use of a recording area of said optical recording medium into which information is recorded.

3. The disc player according to claim 1, wherein said recording test is conducted by use of a recording area of one recording unit into which information is recorded.

4. A recording apparatus, comprising:
   a laser that irradiates a laser beam at least indirectly onto a recording medium;
   a controller that controls an output power of said laser based on a recording test that is performed during a predetermined period,
   wherein said predetermined period is determined based on a difference between an information input rate and an information recording rate, and
   wherein said information input rate is a rate at which data is input to said apparatus, and wherein said information recording rate is a rate at which data is recorded on said recording medium.

5. The apparatus as claimed in claim 4, wherein said predetermined period is contained within a recording period during which data is recorded in a program area of said recording medium.

6. The apparatus as claimed in claim 4, wherein said recording medium is a rewritable optical disc comprising a program area in which general data is recorded, and wherein, during said recording test, said controller records test data in said program area.

7. The apparatus as claimed in claim 6, wherein during a recording operation, said controller controls said laser to record said general data in said program area and controls said laser to record said test data in said program area.

8. The apparatus as claimed in claim 7, wherein said recording medium comprises a lead in area and a lead out area, and wherein said program area is located between said lead in area and said lead out area.

9. The apparatus as claimed in claim 6, wherein said general data is recorded from a first address in said program area to a second address in said program area, and wherein said test data is recorded at an address between said first address and said second address.

10. The apparatus as claimed in claim 9, wherein an area between said first address and said second address is contained with a recording area on which general data of one recording unit is recorded, and wherein said recording test is conducted in the recording area.

11. A method performed by a recording apparatus that records information on a recording medium via a laser, comprising:

(a) determining a time period based on a difference between an information input rate and an information recording rate of said recording apparatus, wherein said information input rate is a rate at which data is input to said apparatus and wherein said information recording rate is a rate at which data is recorded on said recording medium;

(b) performing a recording test during said time period; and (c) controlling an output power of said laser based on said recording test.

12. The method as claimed in claim 11, wherein said time period is contained within a recording period during which data is recorded in a program area of said recording medium.

13. The method as claimed in claim 11, wherein said recording medium is a rewritable optical disc comprising a program area in which general data is recorded, and wherein said operation (b) comprises:

(b1) recording test data in said program area.

14. The method as claimed in claim 13, wherein said operation (b) further comprises:

(b2) recording said general data in said program area.

15. The method as claimed in claim 14, wherein said recording medium comprises a lead in area and a lead out area, and wherein said program area is located between said lead in area and said lead out area.

16. The method as claimed in claim 14, wherein operation (b2) comprises:

(b2a) recording said general data from a first address in said program area to a second address in said program area, and wherein said operation (b1) comprises:

(b2b) recording said test data at an address between said first address and said second address.

17. The method as claimed in claim 16, wherein an area between said first address and said second address is contained with a recording area on which general data of one recording unit is recorded, and wherein said recording test is conducted in the recording area.

* * * * *